United States Patent
Hirschman

(10) Patent No.: US 6,227,666 B1
(45) Date of Patent: May 8, 2001

(54) EYEGLASS FRAME WITH BREAKAWAY FASTENING MEMBER AND METHOD OF INSERTING A LENS IN THE FRAME

(75) Inventor: Richard Hirschman, Albertson, NY (US)

(73) Assignee: Pareto Corporation, Bohemia, NY (US)

( * ) Notice: Subject to any disclaimer, the term of this patent is extended or adjusted under 35 U.S.C. 154(b) by 0 days.

(21) Appl. No.: 09/628,085

(22) Filed: Jul. 28, 2000

(51) Int. Cl.[7] ............................................... G02C 1/08
(52) U.S. Cl. ........................... 351/95; 351/90; 351/98
(58) Field of Search ............................... 351/90, 93, 95, 351/98, 96, 41, 158; 16/228

(56) References Cited

U.S. PATENT DOCUMENTS

| | | |
|---|---|---|
| 475,615 | 5/1892 | Searing . |
| 1,394,608 | 10/1921 | Davern . |
| 1,539,826 | 6/1925 | Boutelle . |
| 2,828,668 | 4/1958 | De Angelis ............................. 88/53 |
| 4,339,179 | 7/1982 | Dany .................................... 351/153 |
| 4,360,252 | 11/1982 | Solomon ................................ 351/95 |
| 4,725,132 | 2/1988 | Piveta .................................... 351/90 |
| 5,517,723 | * 5/1996 | Sircy ..................................... 16/228 |
| 5,917,575 | 6/1999 | Cunningham .......................... 351/90 |

* cited by examiner

Primary Examiner—Hung Xuan Dang
(74) Attorney, Agent, or Firm—Ostrolenk, Faber, Gerb & Soffen, LLP

(57) ABSTRACT

An eyeglass frame includes a first portion and a second portion. The portions define an opening therebetween for receiving and retaining a lens. A fastening member is received by the first and second portions to move the first and second portions relative to each other between a first position whereby the opening is sized to receive the lens, and a second position whereby the opening is sized to retain the lens. The fastening member is constructed and arranged to be of a size to join the first portion to the second portion when the portions are engaged in the first position, and to include a break-away section that allows a portion of the fastening member to be severed therefrom when the portions are engaged in the second position.

31 Claims, 3 Drawing Sheets

EYEGLASS FRAME WITH BREAKAWAY FASTENING MEMBER AND METHOD OF INSERTING A LENS IN THE FRAME

BACKGROUND OF THE INVENTION

1. Field of the Invention

The present invention relates to eyeglass frames and a method for inserting lenses into the eyeglass frames, and in particular to an eyeglass frame and lens insertion method that allows a lens to be easily installed in the eyeglass frame.

2. Description of the Related Art

Many individuals are required to wear eyeglasses. In the case of prescription eyeglasses, separate lenses are required to be inserted into and retained by an eyeglass frame.

Heretofore, the procedure for inserting and retaining a lens in an eyeglass frame has been problematic to opticians or eye care technicians. First, an eyewire screw needs to be removed to loosen the frame to receive the lens. Typically the frame or eyewire includes two halves separated by spaced opposing ends to allow the frame to be opened, i.e. spread apart, to receive the lens. The opposing ends include bushings to receive the eyewire screw and join the two halves together when tightened by a screwdriver. This retains the lens securely in the frame. Before inserting the screw in the bushings, the outer edge of the lens must be aligned with the inside edge of the frame. Particular attention must be placed to match the curvature of the lens to the curvature of the frame. Typically, the outer edge of the frame and the inside edge of the frame are aligned by any of the known methods. For example, the outer edge of the lens is cut with a "V" shaped bevel, or a "U" shaped groove, and the inside edge of the frame is included with a respective corresponding portion to join therewith.

Once the lens and frame are aligned, the eyewire screw is reinserted into the bushings. Before the screw is tightened, the bushings must be aligned. Otherwise, the male threads of the screw will not fit correctly with the female threads of the bushing.

It has been found that properly aligning the bushings to receive the screw is often problematic. Sometimes, the optician does not align the screw with the hole in the bushing. Oftentimes the lens is oversized (this is very common because an undersized lens can not be made to fit the frame and is wasted, but an oversized lens can always be force fit or cut down if necessary) and thereby, forces the optician to hold the two halves of the frame very tightly and awkwardly. When a high degree of pressure is being applied with one of the optician's hands, it tends to add tension to the other hand and often leads to the screwdriver slipping and possibly injuring the optician.

SUMMARY OF THE INVENTION

It has been found that the above disadvantages are overcome in an eyeglass frame comprising a first portion and a second portion, the portions defining an opening therebetween for receiving and retaining a lens; and a fastening member received by the first and second portions to move the first and second portions relative to each other between a first position whereby the opening is sized to receive the lens, and a second position whereby the opening is sized to retain the lens. The fastening member is constructed and arranged to be of a size to join the first portion to the second portion when the portions are engaged in the first position, and to include a break-away section that allows a portion of the fastening member to be severed therefrom when the portions are engaged in the second position.

Preferably, the fastening member is a screw and is chamfered at the break-away section.

In a preferred embodiment, the first portion includes a first bushing to receive the screw, and the second portion includes a second bushing having threads to receive the threads of the screw. The screw joins the first and second portions when the screw is received by the first and second bushings, and is rotated to move the first and second portions into the second position.

Preferably, the first and second bushings are substantially juxtaposed in the second position, and at least a part of the break-away section extends beyond the second bushing in the second position.

In a preferred embodiment, the break-away section includes a joint-line to separate the portion of the fastening member to be severed therefrom from the remainder of the fastening member, the fastening member is severed at the joint-line, and the joint-line does not substantially extend beyond the second bushing.

In a preferred embodiment, a method for inserting a lens in an eyeglass frame comprises the steps of joining first and second portions of the eyeglass frame by a fastening member, the fastening member including a breakaway section that allows a section of the fastening member to be severed therefrom; and adjusting the fastening member to move the first and second portions relative to each other into a first position to receive the lens therebetween, whereby the first and second portions remain joined by the fastening member. Preferably, the method includes the additional steps of adjusting the fastening member to move the first and second portions relative to each other into a second position to retain the lens therebetween; and severing the fastening member at the break-away section.

Other features and advantages of the present invention will become apparent from the following description of the invention which refers to the accompanying drawings.

BRIEF DESCRIPTION OF THE DRAWING(S)

For the purpose of illustrating the invention, there is shown in the drawings an embodiment which is presently preferred; it being understood, however, that the invention is not limited to the precise arrangements and instrumentalities shown.

DETAILED DESCRIPTION OF EMBODIMENTS OF THE INVENTION

Figure 1:
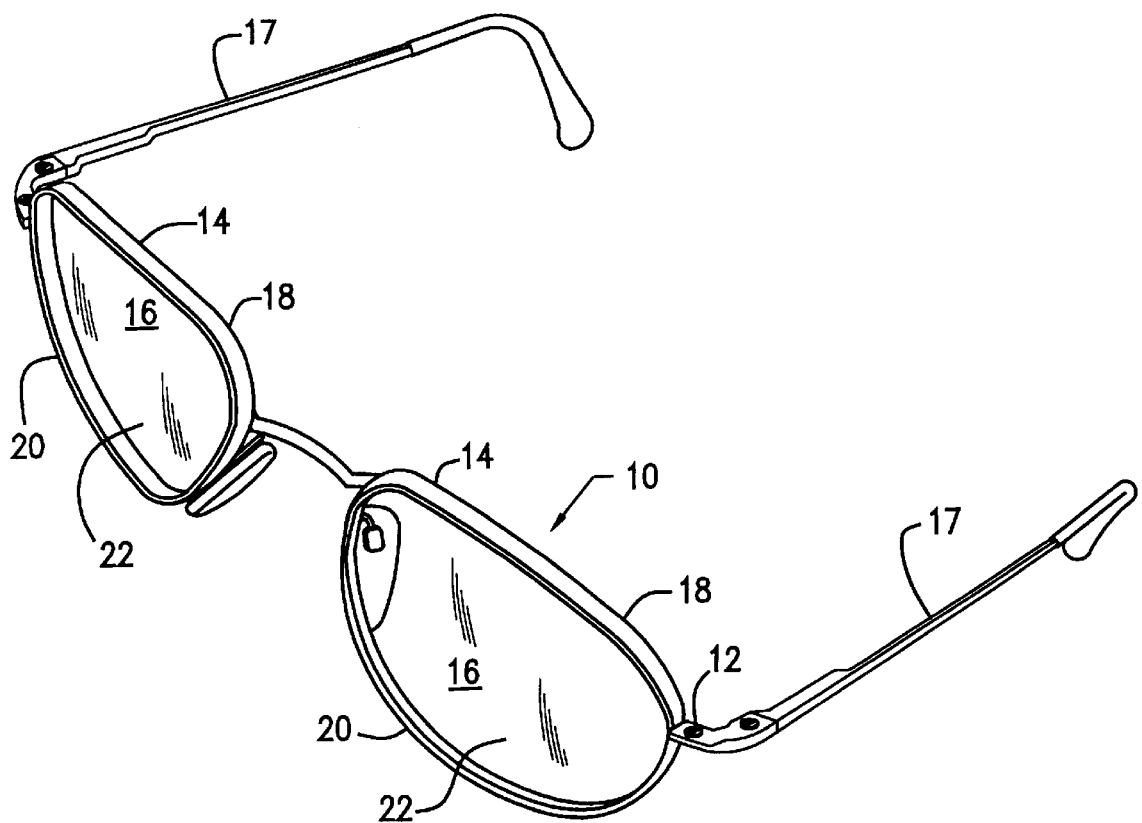
FIG. 1 is a perspective view of the eyeglass frame of the present invention.
Figure 2:
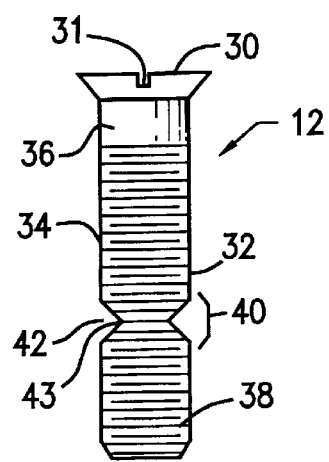
FIG. 2 is a perspective view of the break-away fastening member of the present invention.

Referring now to the drawings where like numerals indicate like elements, there is shown in FIG. 1 an eyeglass frame 10 of the present invention which embodies break-away fastening member 12, FIG. 2. Eyeglass frame 10 includes dual frame portions 14 or eyewires designed to receive and retain lenses 16 therein. Arm portions 17 are attached to frame portions 14 to secure frame 10 on the head of a wearer. Since dual frame portions 14 are identical, reference will only be made to one frame portion herein.

Frame portion 14 includes two halves, namely a top or first portion 18 and a bottom or second portion 20 that define an opening 22 to receive and retain lens 16 therebetween by any of the known methods. Preferably, frame portion 14 includes projections, not shown, extending around the inner circumference of top portion 18 and bottom portion 20. The projections are designed to mate with grooves, not shown, formed on the outer circumference of lens 16. Eyeglass frame 10 can be any of the known frames, e.g., an eyewire frame, that utilize a fastening member such as a screw to join two halves or portions of an eyeglass frame to securely retain a lens therein. Frame 10 can also be a rimless or half-rim frame that utilizes such a fastening member. Eyeglass frame 10 can also be used in connection with any of the known lenses, e.g. sunglass lenses, prescription lenses, etc.

Fastening member 12 joins top portion 18 and bottom portion 20 to secure lens 16 in opening 22. Preferably, fastening member 12 is an eyewire optical screw. Referring now to FIG. 2, screw 12 includes a screw head 30 and a threaded body portion 32. Screw head 30 includes a slot 31 to receive, and be rotated by, a screwdriver. The body portion 32 includes a top portion 34 including a collar 36, and a bottom portion 38. Top portion 34 and bottom portion 38 are separated by a break-away section 40 that is shaped like an "hourglass." Break-away section 40 allows bottom portion 38 to be severed from top portion 34.

Preferably, break-away section 40 includes a chamfered section 42 which allows bottom portion 38 to be severed from top portion 34 at joint-line 43. Once severed, joint-line 43 becomes the end 43a of remaining top portion 34, or screw 12 in general, FIGS. 5 and 5a. Bottom portion 38 is severed from top portion 34 by applying a moderate amount of force, e.g., by use of pliers or the like. If bottom portion 38 is too easily severed from top portion 34, the portions can be prematurely severed during manufacture, shipping or installation, resulting in waste.

A chamfered design for break-away section 40 is preferable so that once severed, end 43a of the remaining top portion 34 has a finished feel and appearance. It should be realized by those skilled in the art that break-away section 40 can be constructed in accordance with any of the known methods, just so long as it allows bottom portion 38 to be severed from top portion 34 with a moderate amount of force. For example, screw 12 can be scored, or be weakened enough by any of the known methods to allow bottom portion 38 to be severed from top portion 34 at the scored or weakened area.

It should also be realized by those skilled in the art that screw 12 not need be an eyewire optical screw and can be any screw or fastening member known in the art made from any of the known materials. Any such prior art optical screw or fastening member can be adapted to include break-away section 40. For example, some optical screws have a plastic sleeve affixed to the collar of the screw. Some screws are treated with nylon or other plastic material so that the plastic tends to "bite" into the female threads and are less likely to loosen thereafter. Other screws may have a long, tapered lead so that it is easy for the screw to find its center during insertion. Some screws may have a Phillips type head.

Referring now to FIGS. 3–5a, frame portion 14 needs to be opened or made larger to receive lens 16 in opening 22. Preferably, frame portion 14 includes a gap 37 between top portion 18 and bottom portion 20. Gap 37 is opened or made larger to increase the size of opening 22 and receive lens 16 therein, and made smaller or closed to securely retain lens 16 between top portion 18 and bottom portion 20.

Figure 3:
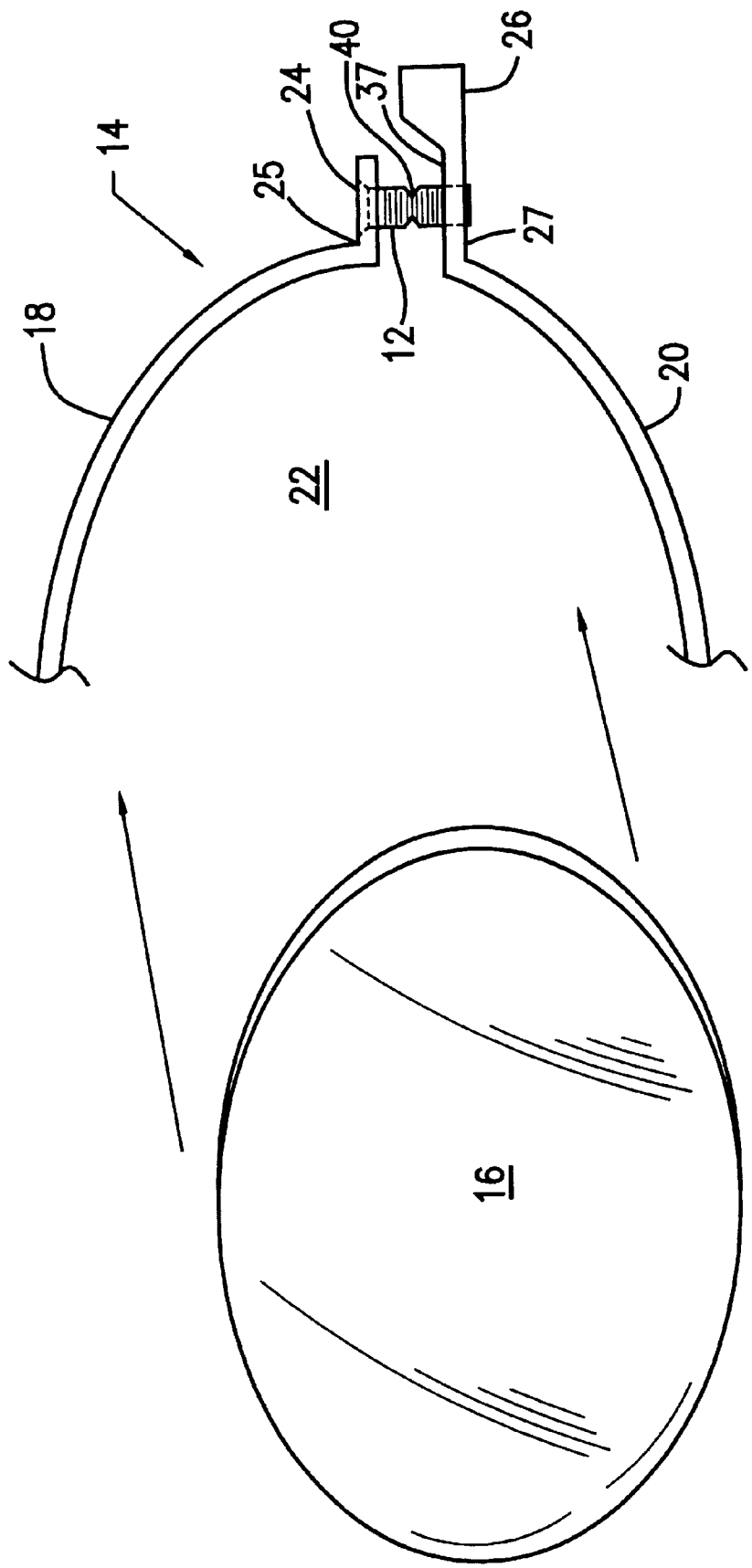
FIG. 3 is a partial front view of the eyeglass frame of the present invention with the break-away fastening member of FIG. 2 partially inserted therein, prior to receiving a lens in the frame.

Screw 12 joins top portion 18 and bottom portion 20, and is used to vary the size of gap 37 and consequently the size of opening 22. Referring now to FIG. 3, top portion 18 and bottom portion 20 preferably include bushings 24 and 26, respectively, to receive screw 12. Bushing 24 includes an outer surface 25, and bushing 26 includes an outer surface 27. Bushing 26 also includes an interior threaded portion, not shown, to receive and work in cooperation with screw 12's threaded body portion 32. By inserting screw 12 in bushings 24 and 26, the screw joins bushings 24 and 26 and consequently top portion 18 and bottom portion 20. Thus, by tightening and loosening (rotating) screw 12 when received by bushings 24 and 26, gap 37 and consequently opening 22 is made smaller or larger, respectively, by moving bushings 24 and 26 with respect to each other. Typically, lens 16 is securely retained in opening 22 within frame portion 14 when screw 12 is tightened to the point where bushings 24 and 26 are in an abutting relationship, and top portion 18 and bottom portion 20 fit tightly around lens 16.

Figure 4:
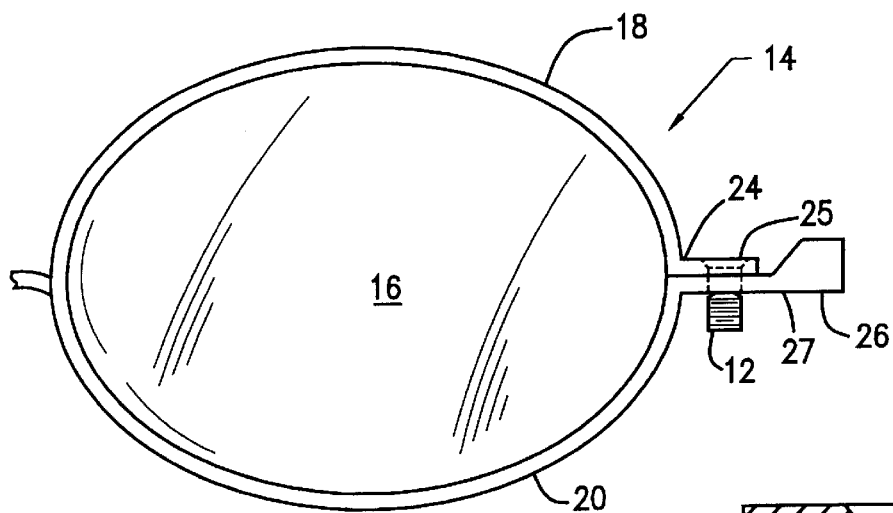
FIG. 4 is a partial front view of the eyeglass frame of the present invention with the break-away fastening member of FIG. 2 fully inserted therein for retaining the lens in the frame, but prior to severing a portion of the break-away fastening member.

Preferably, bushing 24 includes a counterbored recess, not shown, to pass screw body portion 32 therethrough and to seat screw head 30 therein substantially flush with outer surface 25 of bushing 24 when the screw is sufficiently tightened to secure lens 16 within frame portion 14 in opening 22, FIG. 4. Arm portion 17 of frame 10 is attached to bushing 24 (or 26) by any of the known methods.

Preferably, screw 12 is sized so that it joins bushings 24 and 26 even when the bushings are moved to enlarge opening 22 to receive lens 16, FIG. 3. Thus, the optician never needs to fully remove screw 12. Rather, the optician can simply loosen the screw 12 sufficiently so that lens 16 can be inserted in opening 22.

With screw 12 never fully removed, bushings 24 and 26, and top portions 18 and 20, always stay aligned. Thus, to fully secure lens 16 in opening 22, the optician need only insert the lip of frame portion 14 in the grooves formed in lens 16, and simply tighten screw 12.

Figure 4A:
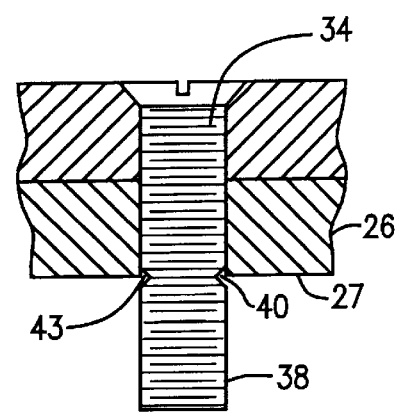
FIG. 4a is an enlarged view of the break-away fastening member of FIG. 4.

Referring now to FIGS. 4 and 4a, when screw 12 is tightened and lens 16 is fully secure, at least a part of break-away portion 40 should extend below or beyond outer surface 27 of bushing 26. Preferably, joint-line 43 should be even or extend slightly below or beyond outer surface 27 of bushing 26, although jointline 43 can extend as far into bushing 26 as will allow bottom portion 38 to be severed from top portion 34.

Figure 5:
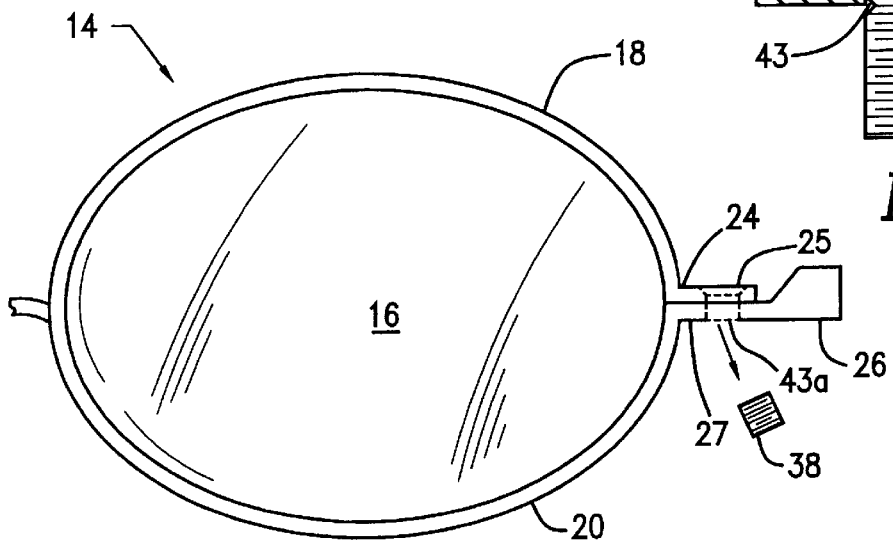
FIG. 5 is the partial front view of the eyeglass frame of FIG. 4, subsequent to severing a portion of the break-away fastening member.
Figure 5A:
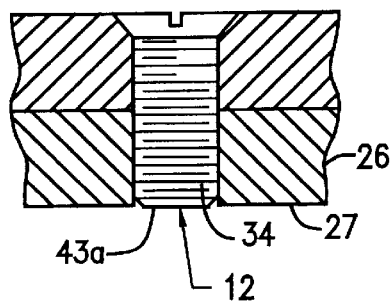
FIG. 5a is an enlarged view of the break-away fastening member of FIG. 5, subsequent to severing a portion of the break-away fastening member.

Referring now to FIGS. 5 and 5a, with a moderate amount of force (for example with pliers), screw 12 will then snap apart at break-away section 40, i.e. at the "hourglass" junction, leaving a flat bottomed conventional appearance to screw 12. If jointline 43 is made even with, or extends slightly below, bottom surface 27 of bushing 26, then once severed, end 43a of remaining top portion 34 will then extend slightly below, or sit substantially flush with, bottom surface 27 of bushing 26 for a finished appearance. From this point forward, screw 12 functions as a normal screw.

In an alternative embodiment, not shown, it should be realized that eyeglass frame 10 and bushings 24 and 26 can be adapted so that screw 12 is inserted in a reversed orientation. In such an alternative embodiment, screw 12 would be inserted first through bushing 26, and then come in contact with a threaded portion of bushing 24. Screw 12 would then be rotated to receive and securely retain lens 16 in opening 22 in the manner described above, except that screw head 30 would be seated in a counterbored recess formed in bushing 26 to sit substantially flush with outer surface 27 of bushing 26, and end 43*a* would extend slightly beyond, or sit substantially flush with, outer surface 25 of bushing 24.

The eyeglass frame with break-away fastening member of the present invention facilitates inserting and securing a lens in the frame. The present invention eliminates the frustration that often goes with the awkward process of inserting and securing a lens in the frame, prevents injuries and increases productivity.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. An eyeglass frame, comprising:
   a) a first portion and a second portion, the portions defining an opening therebetween for receiving and retaining a lens; and
   b) a fastening member received by the first and second portions to move the first and second portions relative to each other between a first position whereby the opening is sized to receive the lens, and a second position whereby the opening is sized to retain the lens, the fastening member being constructed and arranged
      i) to be of a size to join the first portion to the second portion when the portions are engaged in the first position, and
      ii) to include a break-away section that allows a portion of the fastening member to be severed therefrom when the portions are engaged in the second position.

2. The eyeglass frame of claim 1, wherein the fastening member is a screw.

3. The eyeglass frame of claim 2, wherein the screw is chamfered at the break-away section.

4. The eyeglass frame of claim 2, wherein the first portion includes a first bushing to receive the screw.

5. The eyeglass frame of claim 4, wherein the second portion includes a second bushing having threads to receive the threads of the screw.

6. The eyeglass frame of claim 5, wherein the screw joins the first and second portions when the screw is received by the first and second bushings.

7. The eyeglass frame of claim 6, wherein the screw is rotated to move the first and second portions into the second position.

8. The eyeglass frame of claim 7, wherein the first and second bushings are substantially juxtaposed in the second position.

9. The eyeglass frame of claim 8, wherein at least a part of the break-away section extends beyond the second bushing in the second position.

10. The eyeglass frame of claim 9, wherein after the portion is severed from the fastening member, the fastening member does not substantially extend beyond the second bushing.

11. The eyeglass frame of claim 6, wherein the screw is rotated to move the first and second portions into the first position.

12. The eyeglass frame of claim 11, wherein the first and second bushings are in a spaced relationship in the first position.

13. The eyeglass frame of claim 2, wherein the break-away section includes a joint-line to separate the portion of the fastening member to be severed therefrom, from the remainder of the fastening member.

14. The eyeglass frame of claim 13, wherein the fastening member is severed at the joint-line and the joint-line does not substantially extend beyond the second bushing.

15. The eyeglass frame of claim 1, wherein the screw is scored at the break-away section.

16. The eyeglass frame of claim 1, wherein the screw has a first diameter, and a second diameter that is less than the first diameter at the break-away section.

17. An eyeglass frame, comprising:
   a) a rim portion defining an opening therebetween for receiving and retaining a lens, the rim portion including first and second opposing end portions;
   b) a fastening member received by the opposing end portions to move the end portions relative to each other between a first position whereby the opening is sized to receive the lens, and a second position whereby the opening is sized to retain the lens, the member being constructed and arranged
      i) to be of a size to join the end portions when the portions are engaged in the first position, and
      ii) to include a break-away section that allows a portion of the fastening member to be severed therefrom when the portions are engaged in the second position.

18. The eyeglass frame of claim 17, wherein the fastening member is a screw.

19. The eyeglass frame of claim 18, wherein the screw is chamfered at the break-away section.

20. The eyeglass frame of claim 17, wherein at least part of the break-away section extends beyond the second end portion in the second position.

21. The eyeglass frame of claim 20, wherein after the portion is severed from the fastening member, the fastening member does not extend substantially beyond the second end portion.

22. The eyeglass frame of claim 17, wherein the break-away section includes a joint-line to separate the portion of the fastening member to be severed therefrom, from the remainder of the fastening member.

23. The eyeglass frame of claim 22, wherein the fastening member is severed at the joint-line and the joint-line does not substantially extend beyond the second bushing.

24. A method for inserting a lens in an eyeglass frame, the method comprising the steps of:
   joining first and second portions of the eyeglass frame by a fastening member, the fastening member including a break-away section that allows a section of the fastening member to be severed therefrom; and
   adjusting the fastening member to move the first and second portions relative to each other into a first position to receive the lens therebetween, whereby the first and second portions remain joined by the fastening member.

25. The method of claim 24, further comprising the steps of:
   adjusting the fastening member to move the first and second portions relative to each other into a second position to retain the lens therebetween; and
   severing the fastening member at the break-away section.

26. The method of claim 25, wherein at least part of the break-away section extends beyond the second portion in the second position.

27. The method of claim 25, further comprising the step of severing the section from the fastening member so that the fastening member does not extend substantially beyond the second portion.

28. The method of claim 24, wherein the break-away section includes a joint-line to separate the section of the fastening member to be severed therefrom, and the remainder of the fastening member.

29. The method of claim 28, further comprising the step of severing the fastening member at the joint-line.

30. The method of claim 29, further comprising the step of severing the fastening member so that the joint-line does not extend substantially beyond the second portion.

31. The method of claim 24, wherein the fastening member is a screw.

* * * * *